(12) United States Patent
Zhu

(10) Patent No.: US 9,396,025 B2
(45) Date of Patent: Jul. 19, 2016

(54) TIME-VARIANT USE MODELS IN CONSTRAINT-BASED IT RESOURCE CONSOLIDATION

(71) Applicant: Oracle International Corporation, Redwood Shores, CA (US)

(72) Inventor: Shushuai Zhu, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 746 days.

(21) Appl. No.: 13/627,843

(22) Filed: Sep. 26, 2012

(65) Prior Publication Data

US 2014/0089480 A1   Mar. 27, 2014

(51) Int. Cl.
*G06F 15/173* (2006.01)
*G06F 9/50* (2006.01)
*G06Q 10/06* (2012.01)

(52) U.S. Cl.
CPC *G06F 9/50* (2013.01); *G06Q 10/06* (2013.01); *G06F 9/505* (2013.01); *G06F 9/5077* (2013.01)

(58) Field of Classification Search
CPC combination set(s) only.
See application file for complete search history.

(56) References Cited

U.S. PATENT DOCUMENTS 8,255,516 B1 * 8/2012 Zhang et al. ............ 709/224
2006/0179171 A1 * 8/2006 Stefaniak et al. ........ 710/15

* cited by examiner

*Primary Examiner* — Chris Parry
*Assistant Examiner* — Caroline Jahnige
(74) *Attorney, Agent, or Firm* — Vista IP Law Group, LLP

(57) ABSTRACT

A method, system, and computer program product for automated data center platform consolidation. The method commences defining a set of source platforms (e.g., servers, database machines, network infrastructure components, etc.) where the source platforms are associated with time-variant demand models (e.g., computing demand during the working/daytime periods, demand at night, etc.). The demand models can be measured or estimated, and can be in any units of time (e.g., days, hours, etc.). Then a set of target platforms is defined where a member of the set of target platforms has a respective target platform profile comprising an initial time-variant availability model to compare with the time-variant demand models of the source platforms. Time-variant constraints (e.g., not more than 80% utilization during working/daytime periods, etc.) are observed while mapping members of the set of source platforms to the members of the set of target platforms until a consolidation stopping condition is reached.

23 Claims, 11 Drawing Sheets

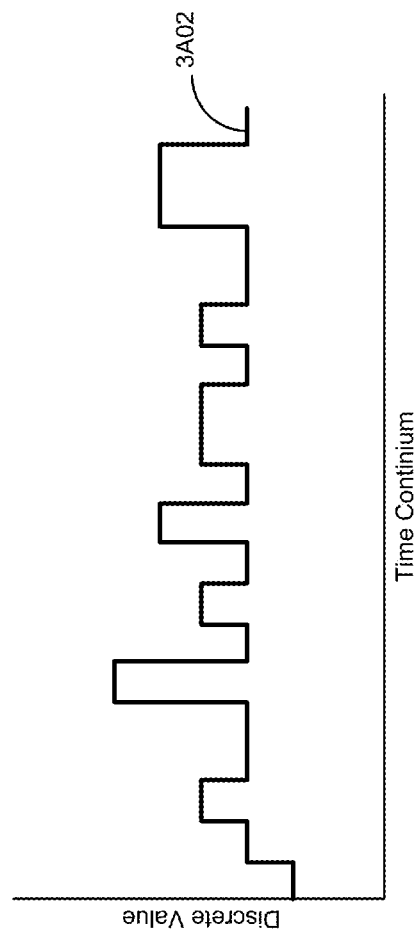
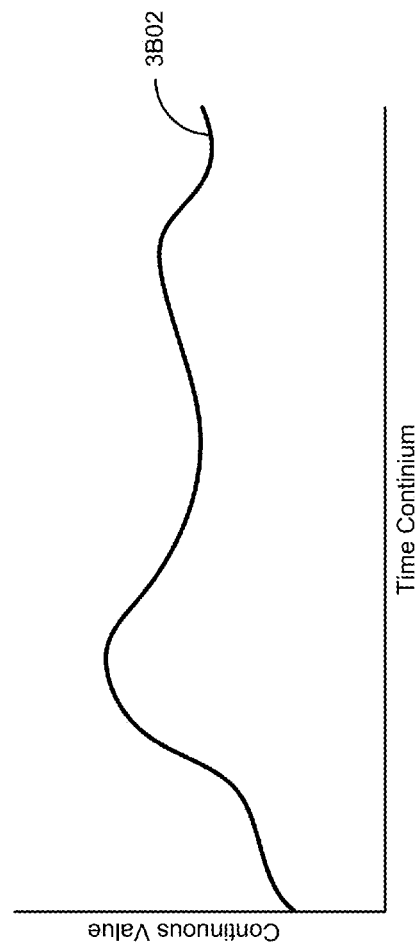

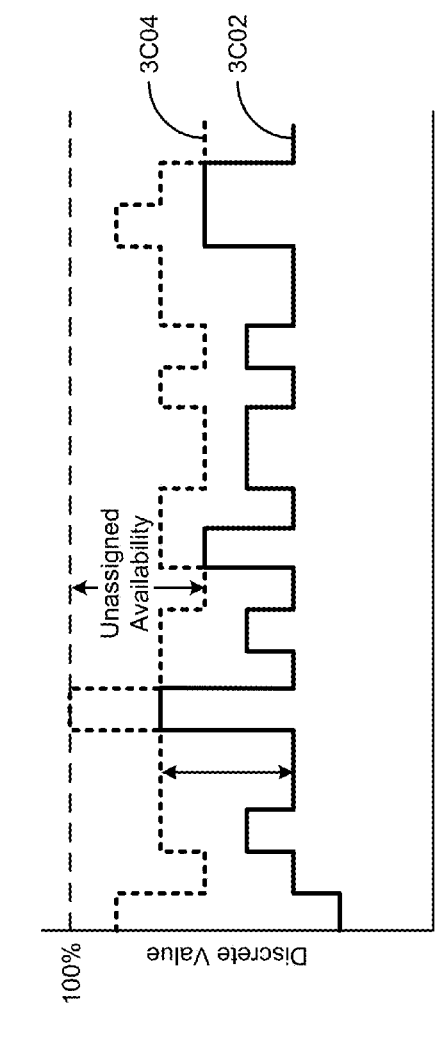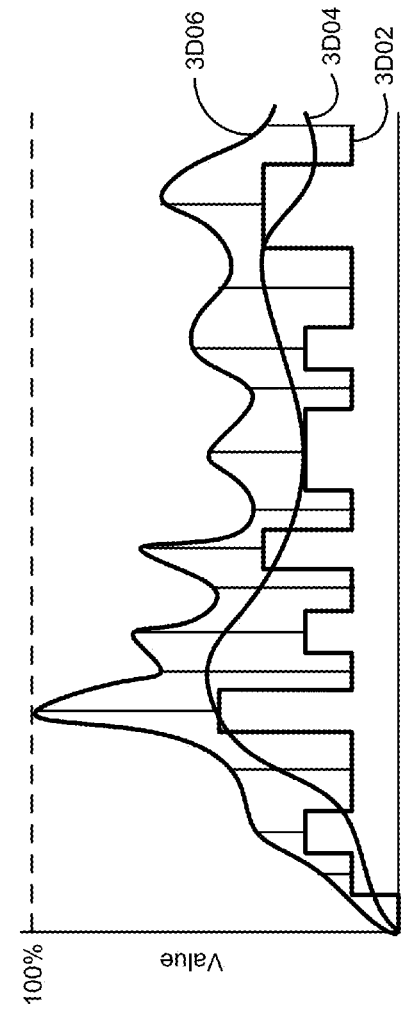

FIG. 6

TIME-VARIANT USE MODELS IN CONSTRAINT-BASED IT RESOURCE CONSOLIDATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of data center management and more particularly to techniques for implementing time-variant use models in constraint-based IT resource consolidation.

BACKGROUND

The inexorable advance of information technology and computing infrastructure places ever greater demands on data center management personnel and techniques. Ever more capable servers (e.g., application servers, database servers, communication servers, etc.) and storage repositories (e.g., SANs and NAS repositories) are perpetually on the horizon. Keeping up to date with the IT technology often requires consolidation to decommission the older equipment in favor of new equipment. Consolidation has many facets, such as:
  Reducing the number of managed devices (e.g., servers, database engines, SANs, etc.);
  Reducing the manpower spent on ongoing or periodic maintenance;
  Reducing the number of ways to manage so as to streamline the management effort; and so on.

Consolidation opportunities abound. The aforementioned managed devices can include hardware and software (e.g., preconfigured platforms) as well as other assets that can be subjected to consolidation techniques as well. For example, consolidation can serve to optimize allocation and utilization of platforms in the form of:
  Software Applications;
  Storage;
  Shared services;
  Network equipment and network bandwidth; and
  Entire data centers, together with their associated human resources.

With respect to hardware assets, especially servers, there are many benefits that accrue to consolidation. In addition to the objective of performing a workload with fewer servers, other benefits are often sought through consolidation. For example:
  Reducing server maintenance costs
  Reducing administration costs and complexity
  Reducing energy and floor space costs
  Improving disaster recovery
  Accommodating future growth
  Improving physical and network security Unfortunately most consolidation efforts are human labor-intensive manual efforts (even when bolstered by computer aided tools) and, in most cases, legacy techniques fail to account for detailed models for mapping and optimization. More specifically the time-variant aspects of a workload are often overlooked. This results in deleterious situations where, for example, a new "more than twice as big" server is commissioned ostensibly to handle the workload of say three or more smaller servers, but the legacy mapping models fail to account for time variant effects, such as very high traffic 9 am-to-5 pm, and very low traffic in the middle of the night. In the event that peak periods are coincident in the smaller servers, then the new, more than twice as big server may be over-taxed during certain time periods. In such a case, a better consolidation mapping might have been to consolidate only two of the smaller servers, and defer decommissioning of the third smaller server to a later date.

Accordingly, better consolidation techniques are needed, and more particularly, consolidation techniques that use time-variant use models as a constraint for IT resource consolidation mapping.

Moreover, the aforementioned technologies do not have the capabilities to perform time-variant use models in constraint-based IT resource consolidation. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for time-variant use models in constraint-based IT resource consolidation.

Disclosed here are methods, systems, and computer program products for automated data center platform consolidation. The method commences defining a set of source platforms (e.g., servers, database machines, network infrastructure components, etc.) where the source platforms are associated with time-variant demand models (e.g., computing demand during the working/daytime periods, demand at night, etc.). The demand models can be measured or estimated, and can be in any units of time (e.g., days, hours, etc.). Then a set of target platforms is defined where a member of the set of target platforms has a respective target platform profile comprising an initial time-variant availability model to compare with the time-variant demand models of the source platforms. Time-variant constraints (e.g., not more than 80% utilization during working/daytime periods, etc.) are observed while mapping members of the set of source platforms to the members of the set of target platforms until a consolidation stopping condition is reached.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 3A is a simplified example of a discrete waveform used in implementing time-variant use models in constraint-based IT resource consolidation, according to some embodiments.

FIG. 3B is a simplified example of a continuous waveform used in implementing time-variant use models in constraint-based IT resource consolidation, according to some embodiments.

FIG. 3C is a simplified example of multiple discrete waveform superposition used in implementing time-variant use models in constraint-based IT resource consolidation, according to some embodiments.

FIG. 3D is a simplified example of mixed-type waveform superposition used in implementing time-variant use models in constraint-based IT resource consolidation, according to some embodiments.

FIG. 6 is an example of a manual mapping UI for implementing time-variant use models in constraint-based IT resource consolidation, according to some embodiments.

DETAILED DESCRIPTION

Figure 1:
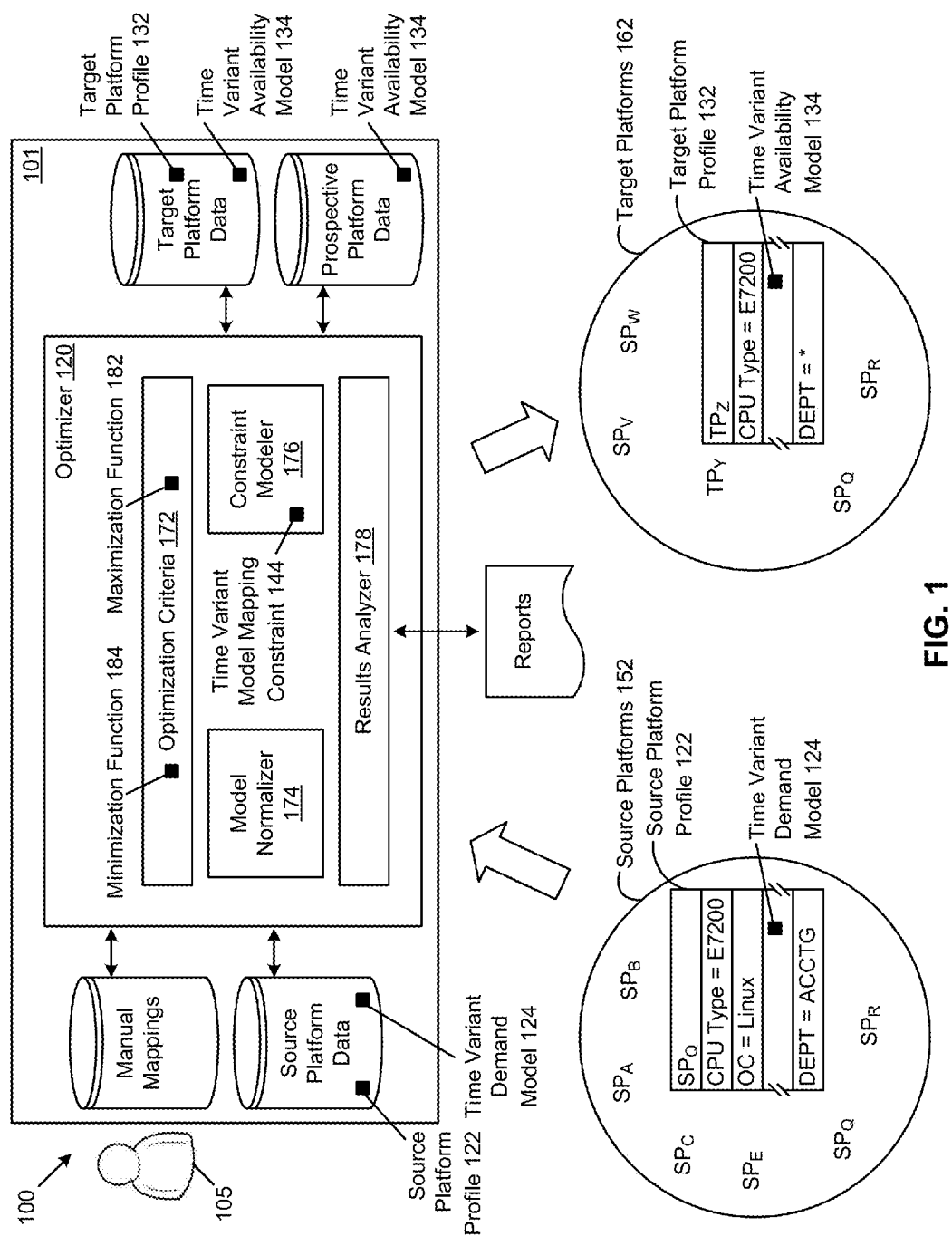
FIG. 1 is a block diagram of a system for implementing time-variant use models in constraint-based IT resource consolidation, according to some embodiments.

Some embodiments of the present disclosure are directed to an improved approach for implementing time-variant use models in constraint-based IT resource consolidation. More particularly, disclosed herein are exemplary environments, methods, and systems.

Overview

Described herein and in the accompanying figures are methods and apparatus for implementing time-variant use models in constraint-based IT resource consolidation.
Categories of Server Consolidation There are many domains in which consolidation can be applied. The techniques described herein are not limited to any particular domain; rather the disclosed techniques have wide applicability. For example some literature on the topic of IT consolidation divides consolidation projects into three categories:

logical consolidation refers to implementing common processes and management across a range of server applications;
  physical consolidation refers to collocating servers in fewer locations;
  rationalized consolidation refers to implementing multiple applications on fewer, more powerful, platforms.

The goals may vary depending on the consolidation domain. For example, an IT department may desire to consolidate under-utilized servers in company data centers so as to achieve a higher average utilization across a server farm. In such a case a group of existing servers (e.g., servers enumerated from a server farm) are defined, and the consolidation effort is approached with a goal to free-up existing servers (e.g., to be decommissioned or redeployed). Or, in another scenario, an IT department may desire to consolidate servers for migrating to the company's private cloud. In such a case a group of existing servers (e.g., servers enumerated from a server farm) are defined, and the consolidation effort is approached to map the existing servers' workload to a set of target cloud servers with a goal to maximize resource utilization (so as to minimize the cost of operating the cloud). In such a case a set of target cloud servers might include actual deployed cloud servers, and might also include prospective additional cloud servers (which can be deployed on demand).

As can now be understood, consolidation can include goal statements that emphasize "Physical to Physical" (P2P) mappings, or can include goal statements that emphasize "Physical to Virtual" (P2V) mappings. Moreover the notion of servers can subsume many embodiments. For example the term server as used herein can apply to:

Existing physical servers.
  Existing virtual servers (e.g., capacity in the form of cloud servers or virtual machines).
  Prospective servers (e.g., servers that might be purchasable and deployable should the consolidation mapping so suggest). In some situations these prospective servers are termed "phantom servers".
  Special purpose systems (e.g., engineered systems such as Exadata database machines, network equipment, etc.).

The consolidation effort can be codified into a word problem stated as: Select a set of servers that minimize cost and can accommodate given workloads subject to:

Target server resource constraints
  Technical constraints
  Business constraints.

The aforementioned constraints can come in a variety of specifications. Strictly as examples, a target server resource constraint can come in the form of a CPU capacity (e.g., instructions per second, clock rate, memory capacity etc.). A business constraint might come in the form of a rule (e.g., do not host any advanced project engineering data on the same server as any sales department applications). A technical constraint might come as a mapping requirement (e.g., the source server hosting applications A, B, and C is a Linux OS machine, so the consolidation mapping has the end up with those applications A, B, and C hosted on a Linux OS machine).

The consolidation effort can be codified into a mathematical problem stated in the form of a bin packing problem. In one case the consolidation problem can be expressed as a bin packing problem having an infinite number of available bins having different sizes/costs in which to pack items of variable sizes. Various bin packing algorithms are known-in-the-art. Some embodiments are discussed herein (e.g., see FIG. 2).

Returning to the aforementioned notion of a target server resource constraint, such constraints can come in the form of a capacity (e.g., CPU instruction/cycle usage), which capacity is intended to be completely or partially filled by some demand for such capacity (e.g., application A demands at least X instructions per second at peak demand). Such a capacity and demand (e.g., for CPU cycles) can come in the form of a scalar value such as "85% of the processor capacity" or such as "2.3 giga-cycles per second", or can come in other forms that express a time variance such as "85% of the processor capacity during business hours and 15% of the processor capacity during off hours". Other forms of modeling time-variant aspects of capacity and demand (as well as associated constraints) are discussed in detail hereunder.

Definitions

Some of the terms used in this description are defined below for easy reference. The presented terms and their respective definitions are not rigidly restricted to these definitions; a term may be further defined by the term's use in within this disclosure.

The term "logic" means any combination of software or hardware that is used to implement all or part of the embodiments of the present disclosure.

A "module" includes any mix of any portions of computer memory and any extent of circuitry including hardwired logic or circuitry embodied as a processor.

Reference is now made in detail to certain embodiments. The disclosed embodiments are not intended to be limiting of the claims.

Descriptions of Exemplary Embodiments

FIG. 1 is a block diagram of a system 100 for implementing time-variant use models in constraint-based IT resource consolidation. As an option, the present system 100 may be implemented in the context of the architecture and functionality of the embodiments described herein. Also, the system 100 or any aspect therein may be implemented in any desired environment.

As shown, the system 100 comprises a set of source platforms 152, a set of target platforms 162, and a mapper 101, which may further comprise an optimizer 120. The mapper processes one or more instances of a source platform profile 122 for each of the source platforms, considers constraints (e.g., time-variant model mapping constraints 144) as well as optimization criteria 172, and produces a proposed set of target platforms that satisfy the criterion while optimizing the results of the mapping. Strictly as one example of optimizing, the optimization criteria 172 might provide an objective function (e.g., minimization function 184 and/or a maximization function 182), and the optimization (e.g., bin packing optimization) might proceed on the basis of such an objective function.

The system stores instances of source platform profiles in a repository for source platform data, and stores instances of target platform profiles 132 in a repository for target platform data. The aforementioned profiles might represent detailed models at various levels of granularity. For example a profile might include models based on CPU processor clock rate, or memory capacity, and/or might include time-variant models covering any of a wide range of features. Accordingly, the system 100 comprises a model normalizer 174. A model normalizer can accept a profile having a time-variant demand model defined at one level of granularity (e.g., hours) and convert and/or normalize into another level of granularity (e.g., days).

As earlier indicated, the mapper processes one or more instances of a source platform profile 122 for each of the source platforms, along with its respective instances of time variant demand models 124 and maps to target platforms along with any respective instances of time variant availability models 134 in conjunction with any instances of time variant model mapping constraints 144, and produces a proposed set of target platforms that satisfy the given constraints.

The time variant models heretofore described are not the only models that can be used for establishing constraints and/or defining an objective function. In fact many other features are considered in the mapping as performed by herein-disclosed embodiments. Strictly as examples, platform resources might include any of the following features, and any of the following features can be used to codify a model to be included in a profile. The following list of features is purely illustrative and not intended to be limiting. Platforms may comprise hardware, which in turn can be characterized by hardware features such as:
CPU
Memory
Disk storage
Disk I/O
Network I/O.

Constraint Modeling

As aforementioned, constraints can come in a variety of specifications. The above examples include business constraints and/or technical constraints, and such business constraints and/or technical constraints can be codified into a time variant constraint (e.g., a time variant model mapping constraint, as shown).

The following lists of constraints are purely illustrative and not intended to be limiting.

Business Constraints

Compliance: In some situations, servers running a certain application cannot be consolidated due to contractual or regulatory provisions.

Security: In some cases, servers in different security zones should not be consolidated on same physical server.

Lifecycle: Sometimes servers under different stages of lifecycle such as testing and production might be constrained so as to dis-allow consolidation on the same server.

Location: Sometimes a specific server or servers have to be within a particular geographic location and thus may not be consolidated to an elsewhere-located consolidated platform.

Technical Constraints

Affinity: For example, to satisfy certain technical and/or performance requirements, servers used for a middle tier and/or a database tier of an application should not be consolidated onto the same physical server.

Topology: In some cases differences in topologies in the platform would preclude or contraindicate consolidation. For example, "Real Application Cluster" (RAC) nodes of a database should not be consolidated onto the same physical server.

High Availability: Servers deployed for provision of specific high-availability or high-reliability characteristics might be constrained from being consolidated onto the same physical server.

CPU Capacity Comparison

In exemplary cases, one constraint model, in particular a time-variant model mapping constraint, might be used to quantitatively compare to instances of time variant demand models 124 and/or instances of a time variant availability model 134 to determine if a time-variant model mapping constraint would be met or would be violated. Some constraints have a time-variance that can be modeled, and some constraints can be modeled as a discrete value (e.g., a string) or as a scalar quantity (e.g., as a number). Accordingly, the system 100 comprises a constraint modeler 176 that can work in conjunction with a model normalizer 174. Such a constraint modeler and a model normalizer, either singly or in combination, aids a user 105 to model constraints.

The following lists of features that can be codified as constraints (e.g., using a constraint modeler) are purely illustrative and not intended to be limiting. Features affecting CPU power that can be codified as constraints are:
CPU vendor
CPU family
CPU model CPU MHz
CPU cores
CPU chips
Threads
Primary cache (MB)
Secondary cache (MB)
Memory (MB)
Disk subsystem
Operating system.

Destination resource limitations that can be codified as constraints are:
    Hardware resource capacities based on a detected server configuration
    User-specified resource limitations for target servers, such as CPU, memory, etc.
    User-specified maximum resource utilization on target servers.

Compatibility requirements that can be codified as constraints are:
    Department
    Lifecycle
    Location
    CPU vendor
    Operating system
    Other compatibility requirements.

Based on Oracle Best Practices, for example, nodes of Real Application Cluster or nodes of Oracle cluster should be isolated from each other and hence cannot be consolidated on the same destination server. Mutually exclusive source server features that can be codified as constraints include (strictly as examples): Nodes of Real Application Cluster (RAC) Database, or Nodes of a cluster (e.g., an Oracle Cluster).

Any of the platform features (e.g., capabilities, limitations, availabilities, demands, or requirements) as discussed herein (and/or other features that fall within the scope of this disclosure) can be normalized. Strictly as an example, the capabilities of a CPU can be measured and normalized. Table 1 lists an illustrative set of processors together with their respective features. In particular, Table 1 lists a set of processors together with their respective SPECint baseline measurement.

TABLE 1

SPECint normalization of processors

| Processor | # Cores | # Chips | # Threads per Core | Processor MHz | Base-line | Published |
|---|---|---|---|---|---|---|
| Core 2 Duo E7200 | 2 | 1 | 1 | 2533 | 29.4 | 2008 September |
| Core 2 Duo E8500 | 2 | 1 | 1 | 3167 | 37.6 | 2008 September |
| Xeon E5405 | 8 | 2 | 1 | 2000 | 101 | 2009 September |
| Xeon E5504 | 8 | 2 | 1 | 2000 | 126 | 2009 September |
| Xeon E5506 | 8 | 2 | 1 | 2133 | 132 | 2009 September |
| Xeon E5520 | 8 | 2 | 2 | 2267 | 185 | 2009 September |
| Xeon E5405 | 4 | 1 | 1 | 2000 | 44.6 | 2008 September |
| Xeon E5405 | 8 | 2 | 1 | 2000 | 93.4 | 2008 November |
| Xeon E5410 | 8 | 2 | 1 | 2333 | 105 | 2009 January |
| Xeon E5420 | 4 | 1 | 1 | 2500 | 60-8 | 2009 January |

A processor that is not found in a data structure such as Table 1 can still be used by system 100 in that a module such as the model normalizer 174 can perform a "fuzzy lookup" in order to match to a similar, but not necessarily identical processor, and the model normalizer and other modules can use the best match in forward calculations. A fuzzy match can use any one or more of the following attributes:
    CPU vendor
    CPU family/model
    CPU cores
    CPU MHz
    Threads
    Primary cache (MB).

Now, having normalized instances of time-variant demand models 124, normalized instances of time-variant availability models 134, and normalized instances of time-variant model mapping constraints 144, an optimizer 120 can use optimization criteria 172 during the performance of a bin packing algorithm to map demand to availability. The results of the mapping operation are analyzed by a results analyzer 178, which in turn may produce output reports. Such a mapping problem is a case of an assignment problem as known in mathematical literature, and bin packing is but one often used technique for solving such an assignment problem. A simplified form of a bin packing algorithm is now briefly discussed.

Figure 2:
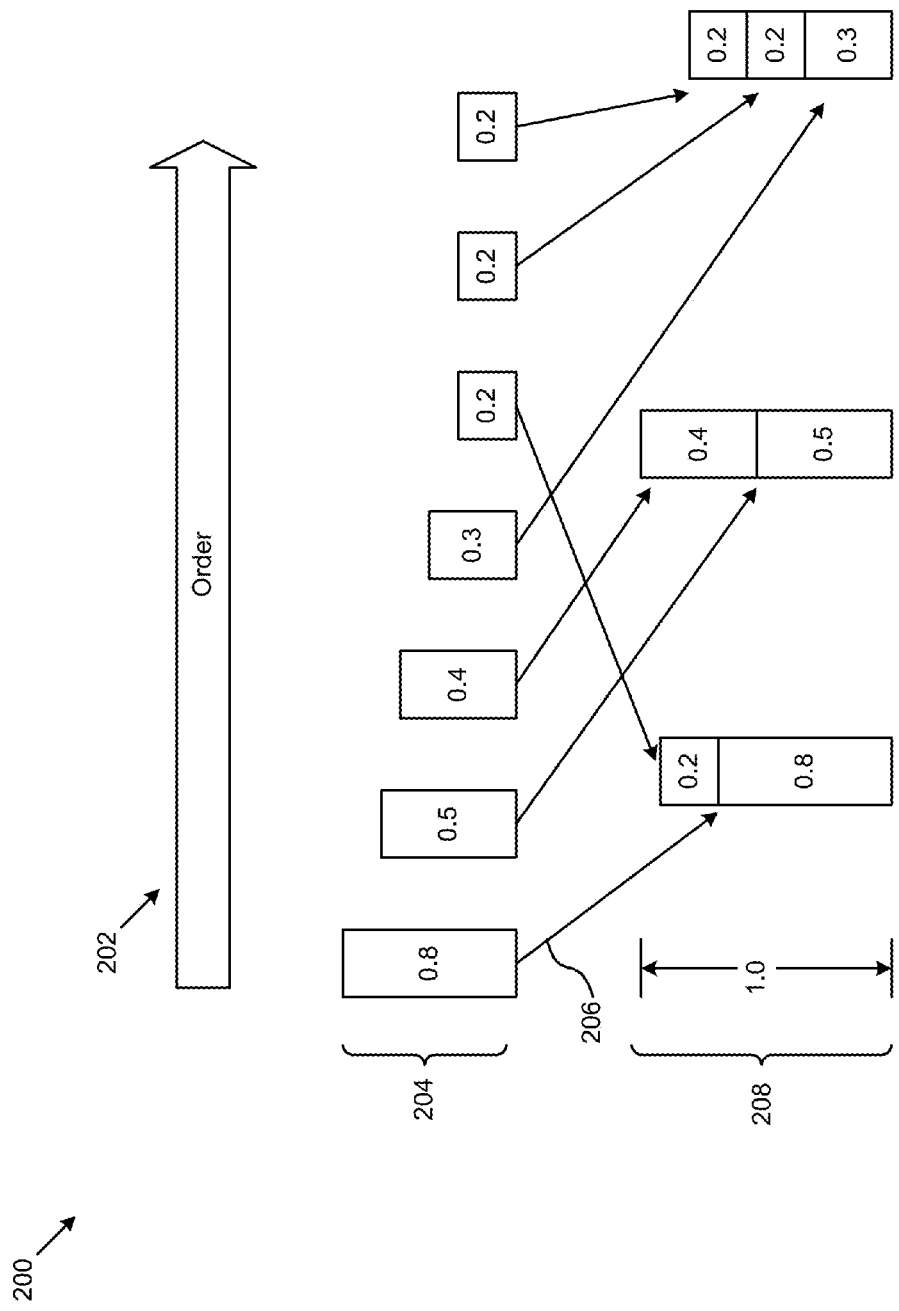
FIG. 2 is a simplified schematic showing a possible bin packing algorithm used in implementing time-variant use models in constraint-based IT resource consolidation, according to some embodiments.

FIG. 2 is a simplified schematic 200 showing a possible bin packing algorithm used in implementing time-variant use models in constraint-based IT resource consolidation. As an option, the present schematic may be implemented in the context of the architecture and functionality of the embodiments described herein. Also, the simplified schematic 200 or any aspect therein may be implemented in any desired environment. The results of the mapping operation are analyzed by a results analyzer 178, which in turn may produce output reports As shown, discrete quanta of demand (e.g., a software program, a demand for CPU cycles, a demand for network bandwidth, etc.) are sorted in an order 202 from largest to smallest. Availability is similarly arranged, largest quanta of discrete availability to smallest. Then shown bin packing algorithm proceeds to "assign" (see assignment arrow 206) the next instance of discrete demand quanta 204 to an open slot among the available slots in the units of target availability 208. The algorithm proceeds iteratively through the discrete demand quanta to make assignments to the discrete quanta of availability, making the assignment as soon as possible, and recording bookkeeping (e.g., assignment of the demand, filling-up of the availability, the assignment mapping, etc.) pertaining to the assignment in advance of commencing the next iteration.

Following this algorithm through to exhaustion of the mapping (e.g., all of the source demands are assigned to a slot in the available targets), it can be seen that the mapping can be accomplished using the shown three units of target availability 208. However, it is possible that fewer units of availability were defined in the target set. In some bin packing algorithms a test is made at the outset to determine if any assignment solution is feasible. On the other hand, some bin packing algorithms permit addition of units of availability as needed, subject to one or more constraints. For example, a bin packing algorithm might observe an instruction such as, "add an additional unit of availability when average bin packing density is 75% or higher".

As can be seen in the foregoing simplified example, the demand is given as a scalar value (e.g., 0.8, 0.5, 0.4, 0.3, 0.2, etc.), and similarly, the availability is given as a scalar value (e.g., 1.0). The example of FIG. 2 is a simplified example, and often a bin packing algorithm relies on bin packing metrics in multiple dimensions. Strictly as an example, a bin packing algorithm might consider scalar values in multiple dimensions, and might consider constraints defined in multiple dimensions. Strictly as example, such dimensions might include:

CPU
Memory
Disk storage
Disk I/O
Network I/O.

Returning to the discussion of implementing time-variant use models in constraint-based IT resource consolidation, many of the aforementioned multiplicity of dimensions can be modeled with respect to time. Details and types of such time-variant models are now briefly discussed.

FIG. 3A is a simplified example of a discrete waveform 3A00 used in implementing time-variant use models in constraint-based IT resource consolidation. As an option, the present discrete waveform 3A00 may be implemented in the context of the architecture and functionality of the embodiments described herein. Also, the discrete waveform 3A00 or any aspect therein may be implemented in any desired environment.

As shown, a resource (e.g., a demanded resource, or an availability resource) can be modeled as a series of discrete values over time 3A02. The discrete values over time might derive from a series of measured values (e.g., average CPU utilization as measured each hour over a 24 hour period). Or estimates or even prophetic values can be used to model demand as a series of discrete values over time. As earlier indicated, two or more time-variant models can be normalized to a common (scaled, normalized) baseline magnitude values. In some embodiments, two or more time-variant models can be normalized to a common (scaled, normalized) time base. For example, time-variant models given in hour-by-hour granularity of samples can be converted so as to be normalized to time-variant models given in a day-by-day granularity of samples.

FIG. 3B is a simplified example of a continuous waveform 3B00 used in implementing time-variant use models in constraint-based IT resource consolidation. As an option, the present continuous waveform 3B00 may be implemented in the context of the architecture and functionality of the embodiments described herein. Also, the continuous waveform 3B00 or any aspect therein may be implemented in any desired environment.

As shown, a resource (e.g., a resource demand or a resource availability) can be modeled as a continuous function over time 3B02. The continuous function over time might derive from a series of measured values (e.g., average CPU utilization as measured each hour over a 24 hour period), which series of measured values are curve-fitted to a continuous function. Or estimates of a continuous function over time or even a prophetic suggestion of a continuous function over time can be used to form the model. As earlier indicated, two or more time-variant models can be normalized to a common (scaled, normalized) baseline magnitude values. In some embodiments, two or more time-variant models can be normalized to a common (scaled, normalized) time base. For example, time-variant models given in hour-by-hour granularity of samples can be converted using any known-in-the-art techniques so as to be normalized against a continuous function with respect to time.

FIG. 3C is a simplified example of multiple discrete waveform superposition 3C00 used in implementing time-variant use models in constraint-based IT resource consolidation. As an option, the present multiple discrete waveform superposition 3C00 may be implemented in the context of the architecture and functionality of the embodiments described herein. Also, the multiple discrete waveform superposition 3C00 or any aspect therein may be implemented in any desired environment.

As shown, two series of discrete values over time (e.g., time-variant discrete values 3C02 and time-variant 3C04) are superimposed, resulting in a summed series of discrete values over time. Using such a superposition technique, one series of discrete values over time can be added to a second series of discrete values over time, and the addition or superposition can be used in determining achievement of constraints (e.g., time-variant model mapping constraints) when performing bin packing or when performing other assignment techniques to map demand to availability during consolidation. In some cases, the addition of the time-variant demand from one resource to the time-variant demand of another resource (e.g., two series of discrete values over time) can result in a time-variant utilization pattern. And in some cases, the time-variant utilization pattern may exhibit periods of less than (or more than) 100%.

FIG. 3D is a simplified example of mixed-type waveform superposition 3D00 used in implementing time-variant use models in constraint-based IT resource consolidation. As an option, the present mixed-type waveform superposition 3D00 may be implemented in the context of the architecture and functionality of the embodiments described herein. Also, the mixed-type waveform superposition 3D00 or any aspect therein may be implemented in any desired environment.

As shown, a series of discrete values 3D02 are superimposed together with a continuous time-variant function 3D04. This superposition can result in an aggregated time-variant series of values (e.g., by taking an average value of the continuous function). Or, this superposition can result in continuous function over time 3D06 (e.g., by curve fitting). Using such a superposition technique, a continuous function over time can be added to a series of discrete values over time, and the addition or superposition can be used in determining achievement of constraints (e.g., time-variant model mapping constraints, normalized time-variant model mapping constraints, etc.) when performing bin packing or when performing other assignment techniques to map demand to availability during consolidation.

Various optimization techniques can be used to maximize complementary packing or other desired packing. As shown in Table 2, a usage profile can comprise details of the source platform characteristics as well as can comprise characteristics of the time-variant models, and can comprise a user's preferred method for calculating quantities when performing aggregation.

TABLE 2

Sample usage profile

| Usage Type | Usage Measurement | Applicable Time Periods | Aggregation Method |
|---|---|---|---|
| CPU (SPEC rate) | Hourly average | Specified day of week | Average |
| Memory (GB) | Maximum hourly average | Weekdays | Maximum |
| Disk I/O (IO/sec) | Averaged hourly average | Weekends | Minimum |
| Disk I/O (MB/sec) | Averaged hourly average | All days | 95 percentile |
| Network I/O (MB/sec) | Averaged hourly average | All days | 80 percentile |

TABLE 2-continued

Sample usage profile

| Usage Type | Usage Measurement | Applicable Time Periods | Aggregation Method |
|---|---|---|---|
| Disk storage (GB) | Maximum hourly average | All days | Maximum |

Various optimization techniques can be used to minimize or avoid antagonistic workloads being packed together. For example a workload that has a pattern of alternation of intense network activity versus intense CPU activity might be packed in a complementary manner with a workload that has a 180 degree out of phase pattern of the alternation of intense CPU activity versus intense network activity.

Figure 4:
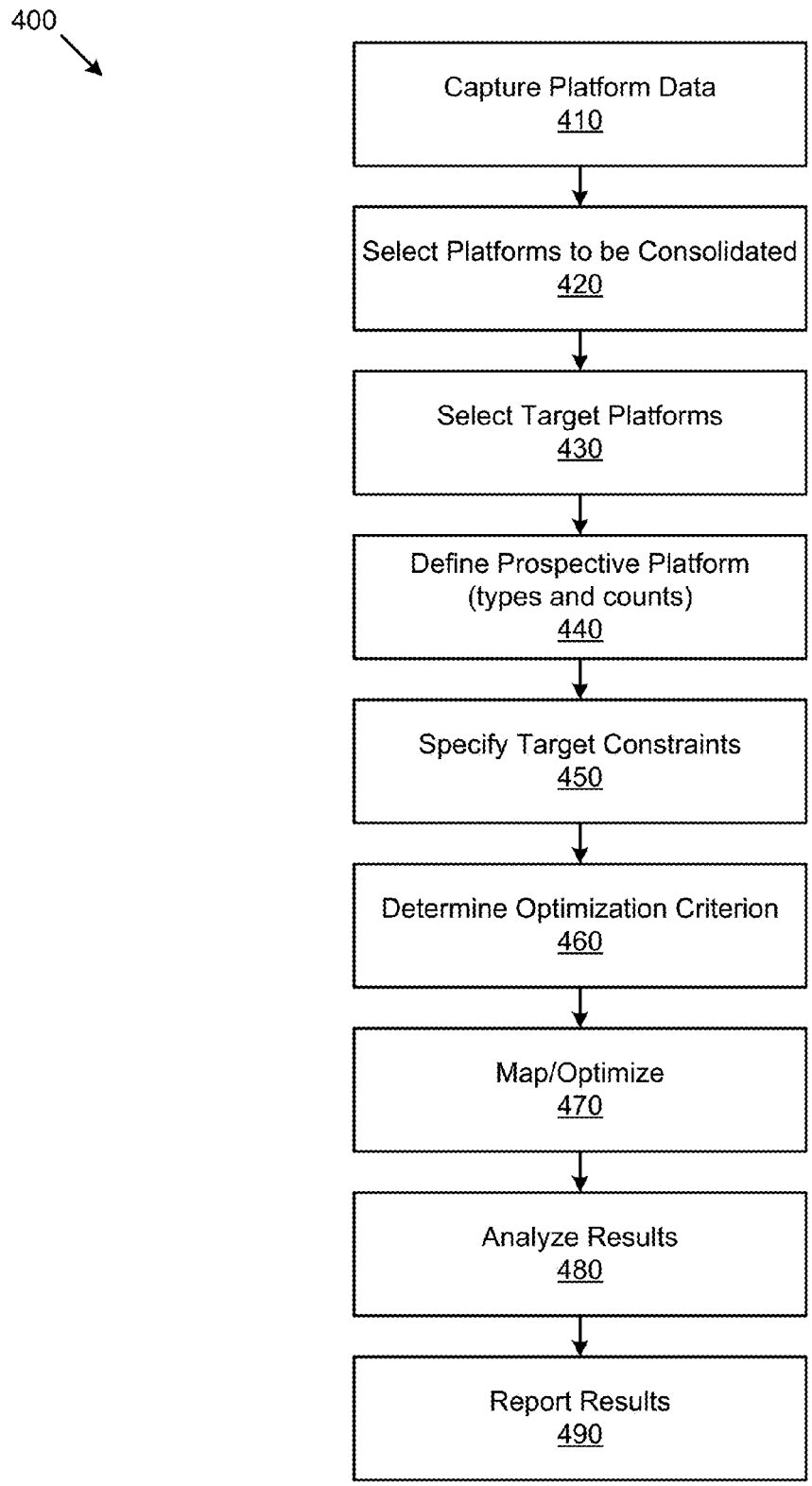
FIG. 4 is a sequence chart for implementing time-variant use models in constraint-based IT resource consolidation, according to some embodiments.

FIG. 4 is a sequence chart 400 for implementing time-variant use models in constraint-based IT resource consolidation. As an option, the present sequence chart 400 may be implemented in the context of the architecture and functionality of the embodiments described herein. Also, the sequence chart 400 or any aspect therein may be implemented in any desired environment.

The sequence chart commences upon capturing platform data (see operation 410). The platform data can comprise platform measurements or samples taken at time intervals, or can comprise a continuous time-variant function. In many cases, source platform data can comprise time-invariant values. For example, a CPU in a source platform might be vended by a particular vendor (e.g., "Intel") and might come from a particular CPU family (e.g., "Xeon") and might be known by a particular CPU model designation (e.g., "E5420"), and such features or dimensions do not change over time.

In operation 420, a user 105 might specify a set of source platforms to be consolidated. Similarly, in operation 430, a user 105 might specify a set of target platforms onto which the source platforms are to be consolidated. Again referring to feasibility and bin packing algorithms, it is possible that a user can specify prospective target platforms (see operation 440). For example a user might specify a prospective target platform to reflect an intended purchase. Or, a user might specify a prospective target platform to reflect the user's intent to expand a cloud subscription.

In order to direct the assignment and optimization algorithms, a user might specify target constraints (see operation 450) to apply while making the assignments. For example, a user might specify a headroom constraint such as, "no target server shall have more than 90% utilization". Or, considering the patterns of time-variant use models a user might specify a headroom constraint such as, "no target server shall have more than 90% instantaneous utilization", or "no target server shall have more than 90% utilization for more than 10 minutes".

In some cases, a user might manually map one or more source platforms to one or more target platforms. This can be done for a variety of reasons, for example some portion of the consolidation might be being done to facilitate a physical move or a divestiture, in which cases it might be a given that some set of source demand is needed to be mapped to some particular target platforms.

As earlier mentioned, an assignment algorithm (e.g., a bin packing algorithm) can proceed on the basis of an objective function, and, in some cases, a completed assignment can be deemed optimal with respect to the objective function. Thus, in some embodiments a user might supply optimization criteria (see operation 460). Optimization criteria 172 can come in various forms, including a maximization function 182, or a minimization function 184, etc.

The shown sequence commences to a map/optimize step (see operation 470), which may include one or more stopping conditions such as "first fit", or "best fit" or some other condition or conditions, possibly including a predefined or calculated threshold such that upon reaching the threshold the mapping is gracefully terminated.

There are myriad approaches to achieve qualitatively desired and/or objectively optimal results. The approaches listed below are purely exemplary, and other objective functions are contemplated and reasonable in the context of implementing time-variant use models in constraint-based IT resource consolidation. Approaches include:

Bin pack so as to minimize the number of prospective assigned target servers.

Order source demand by magnitude of the most important dimension (e.g., in a descending order), such as by CPU SPECint, then order by other dimensions when CPU SPECint value is tied.

Bin pack so as to achieve a best fit using decreasing bin-packing by multiple resources.

Bin pack so as to achieve a calculated total resource utilization efficiency.

Bin pack so as to select a candidate target server with the most unassigned availability or least resource wastage (e.g., in case of a tie, or near tie).

Bin pack so as to achieve a balanced load across a set of target servers.

Figure 7:
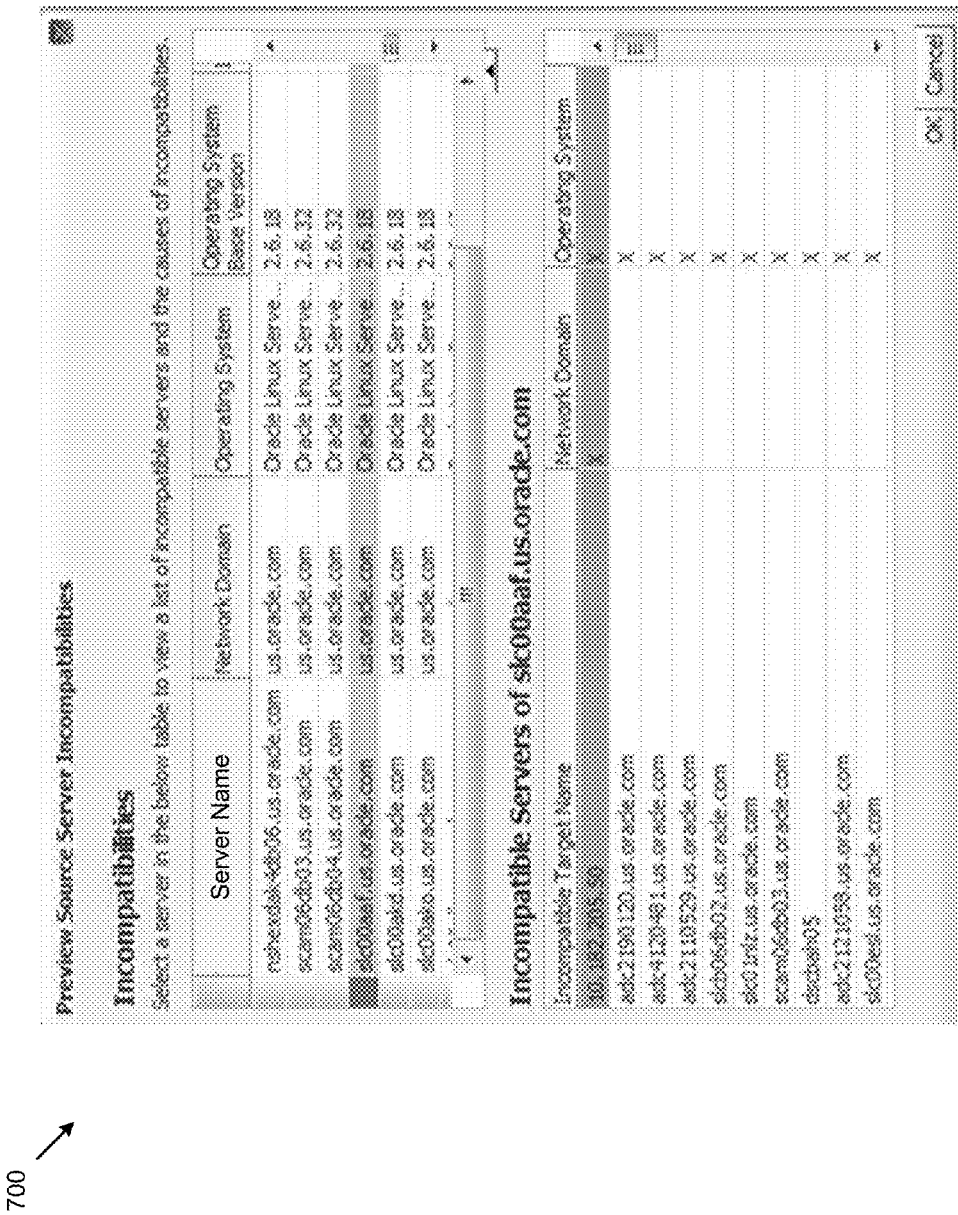
FIG. 7 is an example of an incompatibility matrix report for tuning mapping constraints in a system for time-variant use models in constraint-based IT resource consolidation, according to some embodiments.

After optimization has reached a stopping condition, the results can be analyzed (see operation 480) and results reported (see operation 490). Examples of analysis and reports include the following Key Performance Indicators (KPI) to compare scenarios:

Consolidation ratio (sources:destinations)
Confidence (back-testing)
Exclusions (could not be consolidated)
Violations (constraints)
Incompatibilities (see FIG. 7).

It is also possible that a reporting facility can perform detailed analysis and can produce detailed charts or reports. The list below is illustrative and is not intended to be limiting. Reports can include:

Mapping between source servers and target servers
Confidence heat maps (e.g., a visualized chart showing the projected resource utilization on target servers with more heat indicating more resource contention)
Checks/Results based on back-testing at hourly granularity (e.g., comparing projected resource usages and target capacities to indicate contentious hours)
Data points evaluated (e.g., past hours for which usages of specified resources are evaluated)
Data points not meeting requirements (e.g., past hours for which the projected resource usages would exceed the specified limits on the target servers)
Most intensive resource consumption on a particular target over a series of time periods.

Figure 5:
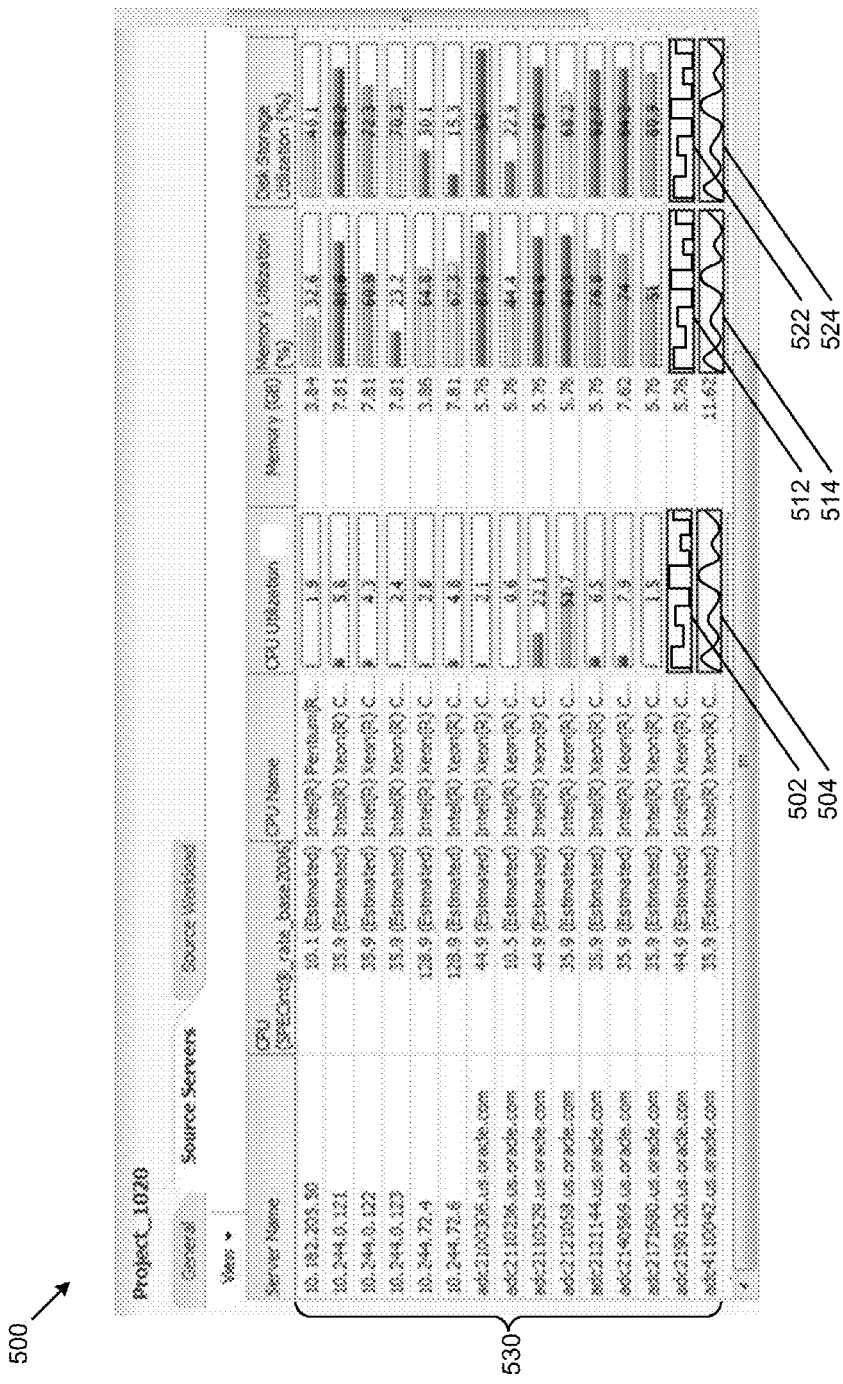
FIG. 5 is an example of a source server specification UI for implementing time-variant use models in constraint-based IT resource consolidation, according to some embodiments.

FIG. 5 is an example of a source server specification UI 500 for implementing time-variant use models in constraint-based IT resource consolidation. As an option, the present source server specification UI 500 may be implemented in the context of the architecture and functionality of the embodiments described herein. Also, the source server specification UI 500 or any aspect therein may be implemented in any desired environment.

As shown, a set of resources 530 are listed, together with their respective values in the shown columns. In particular, and as shown, certain time variant utilization characteristics are provided for some of the resources. For example, see the discrete time-variant CPU utilization 502, and the continuous time-variant CPU utilization 504. Also depicted are discrete time-variant memory utilization 512, and the continuous time-variant memory utilization 514, as well as discrete time-variant disk storage utilization 522, and the continuous time-variant disk storage utilization 524.

Figure 6:
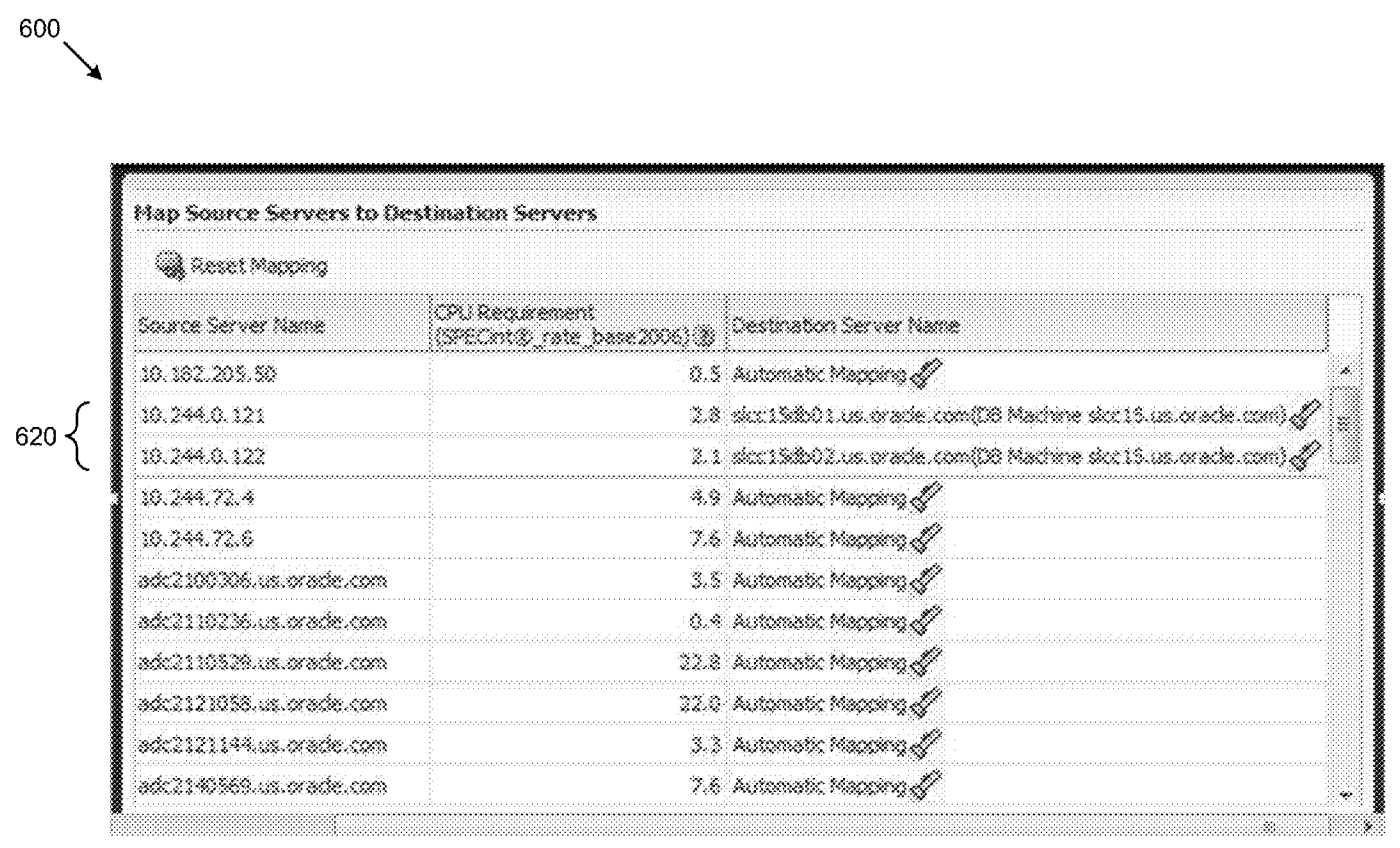

FIG. 6 is an example of a manual mapping UI 600 for implementing time-variant use models in constraint-based IT resource consolidation. As an option, the present manual mapping UI 600 may be implemented in the context of the architecture and functionality of the embodiments described herein. Also, the manual mapping UI 600 or any aspect therein may be implemented in any desired environment.

In the example shown, manually-mapped source servers (e.g., 10.244.0.121 and 10.244.0.122) are manually mapped to respective destination servers (e.g., slcc15db01 and slcc15db02, respectively). Specifying one or more manual mapping rows 620 ensures that the specified source resource is mapped to the destination resource in the final mapping. When specified, other source resources might be mapped to the mapped-to destination resource. Also, when specified, the mapping can be considered an exclusive mapping, and other source resources are not mapped to the mapped-to destination resource.

FIG. 7 is an example of an incompatibility matrix report 700 for tuning mapping constraints in a system for time-variant use models in constraint-based IT resource consolidation. As an option, the present incompatibility matrix report 700 may be implemented in the context of the architecture and functionality of the embodiments described herein. Also, the incompatibility matrix report 700 or any aspect therein may be implemented in any desired environment.

The matrix report as shown depicts a set of incompatible target servers for the selected server. An incompatibility can be caused as a result of a variety of reasons, for example a technical constraint (e.g., the operating system must match) or a business constraint (e.g., the advanced development department does not share with any other department), or any other constraint for that matter.

Figure 8:
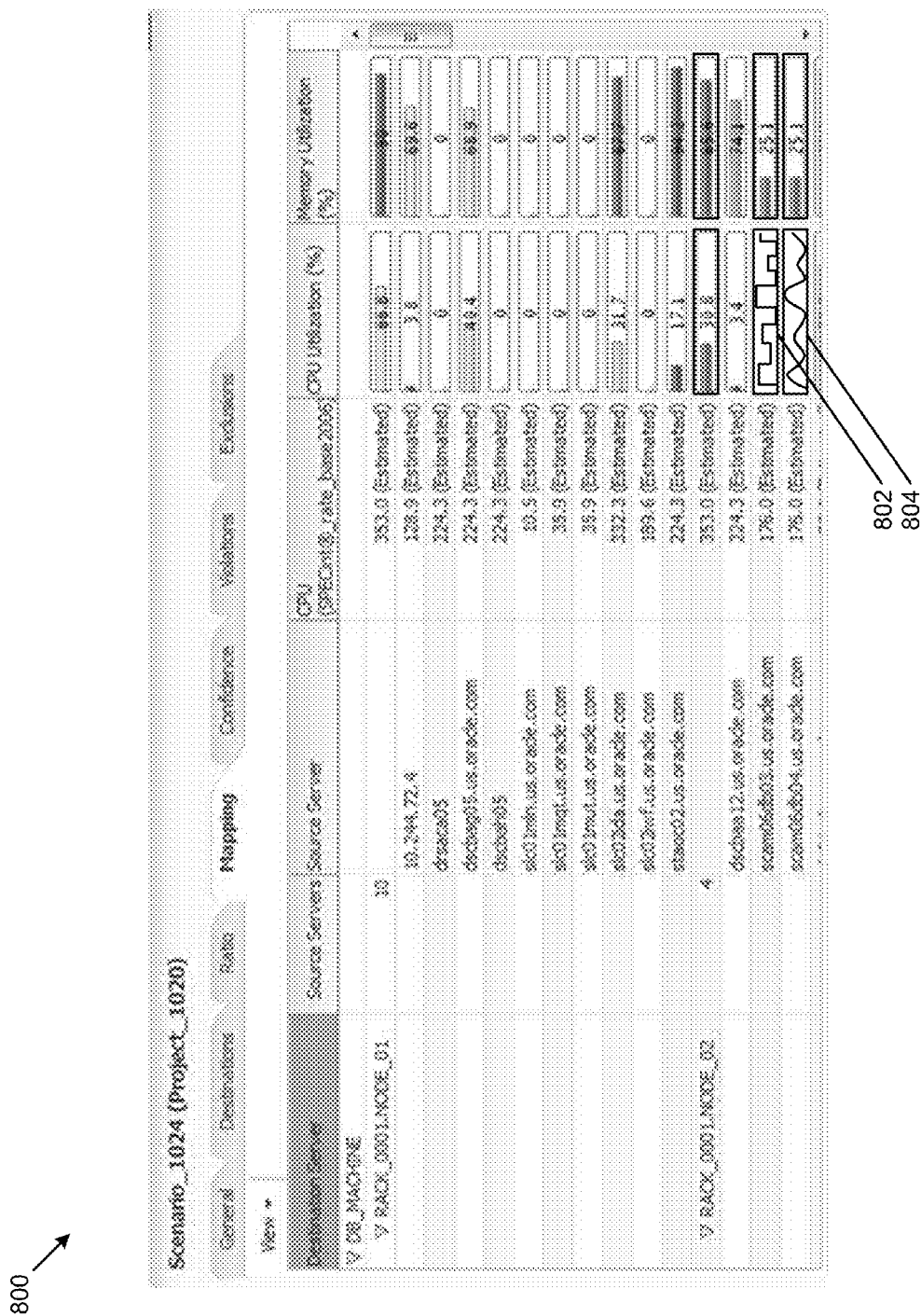
FIG. 8 is an example of a mapping report generated by a system for time-variant use models in constraint-based IT resource consolidation, according to some embodiments.

FIG. 8 is an example of a mapping report 800 generated by a system for time-variant use models in constraint-based IT resource consolidation. As an option, the present mapping report 800 may be implemented in the context of the architecture and functionality of the embodiments described herein. Also, the mapping report 800 or any aspect therein may be implemented in any desired environment.

The destination resource (e.g., the shown Destination Server) is given together with the source resources (e.g., the shown Source Servers) mapped to the destination resource. The aggregate utilization in each shown dimension can be depicted as a scalar value (e.g., a percentage) or as a time-variant utilization (e.g., discrete value time-variant CPU utilization pattern 802, continuous time-variant CPU utilization pattern 804).

Additional Embodiments of the Disclosure

Figure 9:
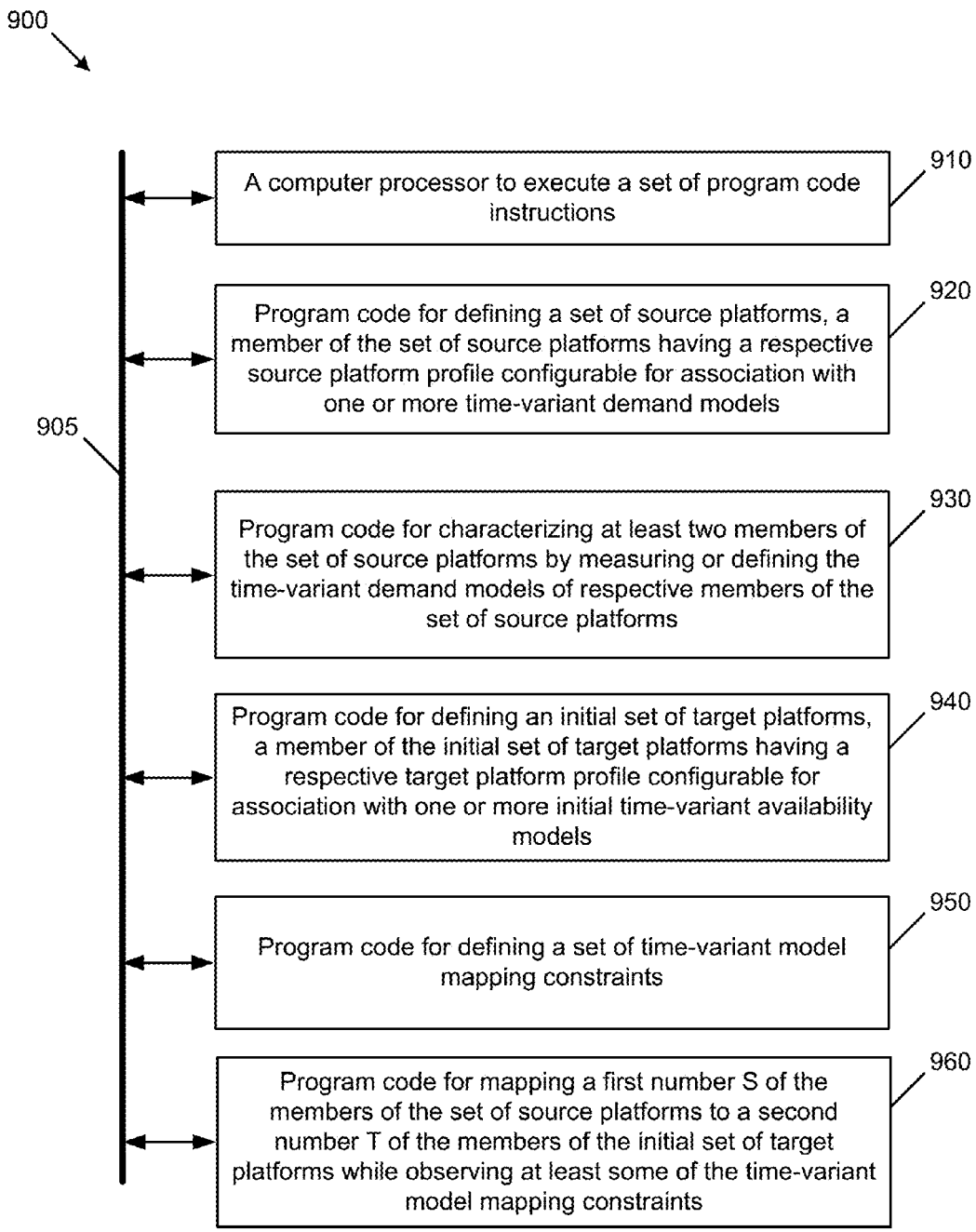
FIG. 9 depicts a block diagram of a system to perform certain functions of a computer system.

FIG. 9 depicts a block diagram of a system to perform certain functions of a computer system. As an option, the present system 900 may be implemented in the context of the architecture and functionality of the embodiments described herein. Of course, however, the system 900 or any operation therein may be carried out in any desired environment. As shown, system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims. The embodiment of FIG. 9 implements a portion of a computer system, shown as system 900, comprising a computer processor to execute a set of program code instructions (see module 910) and modules for accessing memory to hold program code instructions to perform: defining a set of source platforms, a member of the set of source platforms having a respective source platform profile having one or more time-variant demand models (see module 920); characterizing at least two members of the set of source platforms by measuring or defining the time-variant demand models of respective members of the set of source platforms (see module 930); defining an initial set of target platforms, a member of the initial set of target platforms having a respective target platform profile having one or more initial time-variant availability models (see module 940); defining a set of time-variant model mapping constraints (see module 950); and mapping a first number S of the members of the set of source platforms to a second number T of the members of the initial set of target platforms while observing at least some of the time-variant model mapping constraints (see module 960).

System Architecture Overview

Figure 10:
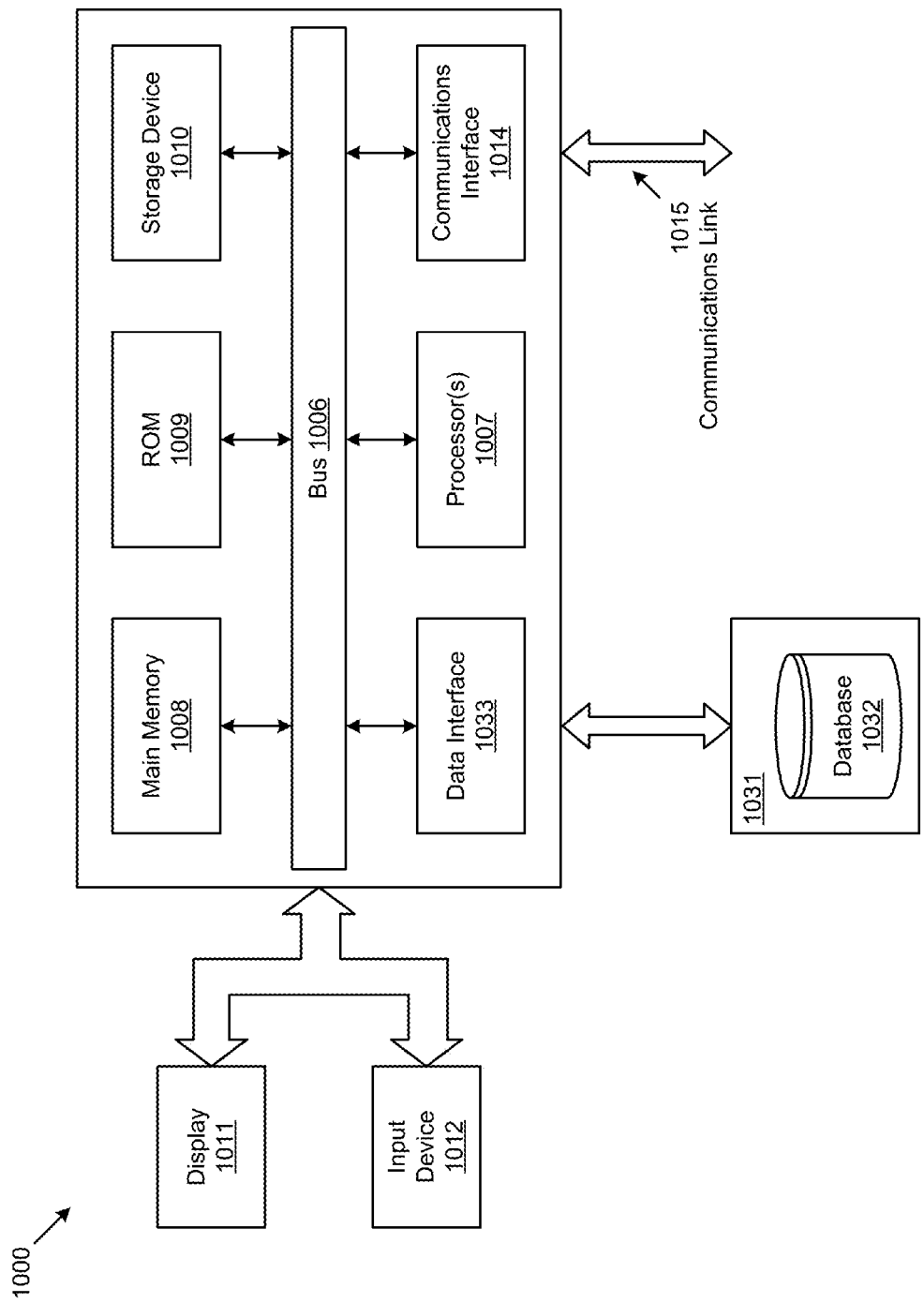
FIG. 10 depicts a block diagram of an instance of a computer system suitable for implementing an embodiment of the present disclosure.

FIG. 10 depicts a block diagram of an instance of a computer system 1000 suitable for implementing an embodiment of the present disclosure. Computer system 1000 includes a bus 1006 or other communication mechanism for communicating information, which interconnects subsystems and devices, such as a processor 1007, a system memory 1008 (e.g., RAM), a static storage device (e.g., ROM 1009), a disk drive 1010 (e.g., magnetic or optical), a data interface 1033, a communication interface 1014 (e.g., modem or Ethernet card), a display 1011 (e.g., CRT or LCD), input devices 1012 (e.g., keyboard, cursor control), and an external data repository 1031.

According to one embodiment of the disclosure, computer system 1000 performs specific operations by processor 1007 executing one or more sequences of one or more instructions contained in system memory 1008. Such instructions may be read into system memory 1008 from another computer readable/usable medium, such as a static storage device or a disk drive 1010. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 1000. According to certain embodiments of the disclosure, two or more computer systems 1000 coupled by a communications link 1015 (e.g., LAN, PTSN, or wireless network) may perform the sequence of instructions required to practice the disclosure in coordination with one another.

Computer system 1000 may transmit and receive messages, data, and instructions, including programs (e.g., application code), through communications link 1015 and communication interface 1014. Received program code may be executed by processor 1007 as it is received, and/or stored in disk drive 1010 or other non-volatile storage for later execution. Computer system 1000 may communicate through a data interface 1033 to a database 1032 on an external data repository 1031. A module as used herein can be implemented using any mix of any portions of the system memory 1008, and any extent of hard-wired circuitry including hard-wired circuitry embodied as a processor 1007.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method to implement time-variant use models in constraint-based IT resource consolidation, the method comprising:
defining a set of source platforms, a member of the set of source platforms having a respective source platform profile having one or more time-variant demand models, at least some of the one or more time-variant demand models associated with a set of values describing demand for an IT resource over a specified period of time;
characterizing at least two members of the set of source platforms by measuring or defining the time-variant demand models of respective members of the set of source platforms;
defining an initial set of target platforms, a member of the initial set of target platforms selected from the set of source platforms and having a respective target platform profile having one or more initial time-variant availability models to compare with one or more of the time-variant demand models, at least some of the one or more initial time-variant availability models associated with a set of values describing availability of an IT resource over a specified period of time; and
mapping, by a computer, a first number S of the members of the set of source platforms to a second number T of the members of the initial set of target platforms while observing at least one time-variant model mapping constraint, wherein observing the at least one time-variant model mapping constraint comprises:
superimposing a plurality of sets of values associated with one or more time-variant demand models of an IT resource, wherein at least one of the plurality of sets of values is expressed as discrete values over time and at least one additional set of values of the plurality of sets of values is expressed as a continuous function, and
comparing the superimposed plurality of sets of values with one or more sets of values describing availability of a corresponding IT resource over a corresponding period of time.

2. The method of claim 1, wherein the at least one time-variant model mapping constraint comprises an hour-by-hour model pattern.

3. The method of claim 1, wherein at least one of the time-variant model mapping constraints comprises a normalized time-variant model mapping constraint.

4. The method of claim 1, wherein the initial set of target platforms includes at least one of, an instance of a source platform from among the set of source platforms, a prospective target platform, or a database machine.

5. The method of claim 1, further comprising calculating an incompatibility matrix report.

6. The method of claim 1, wherein the mapping includes an optimization criterion.

7. The method of claim 6, wherein the optimization criterion comprises at least one of, a minimization function, or a maximization function.

8. The method of claim 1, further comprising:
generating a report of the mapping of the members of the set of source platforms to the members of the initial set of target platforms, the report including information describing one or more of the initial set of target platforms to which a member of the set of source platforms cannot be mapped due to the at least one time-variant model mapping constraint and one or more of a ratio of the first number S of the members of the set of source platforms mapped to a second number T of the members of the initial set of target platforms, a violation of a mapping constraint, and exclusion of one or more members of the set of source platforms from the mapping, wherein the at least one time-variant model mapping constraint is associated with usage of an IT resource during one or more specified days of a week.

9. A computer system to implement time-variant use models in constraint-based IT resource consolidation, comprising:
a computer processor to execute a set of program code instructions; and
a memory to hold the program code instructions, in which the program code instructions comprises program code to perform:
defining a set of source platforms, a member of the set of source platforms having a respective source platform profile having one or more time-variant demand models, at least some of the one or more time-variant demand models associated with a set of values describing demand for an IT resource over a specified period of time;
characterizing at least two members of the set of source platforms by measuring or defining the time-variant demand models of respective members of the set of source platforms;
defining an initial set of target platforms, a member of the initial set of target platforms selected from the set of source platforms and having a respective target platform profile having one or more initial time-variant availability models to compare with one or more of the time-variant demand models, at least some of the one or more initial time-variant availability models associated with a set of values describing availability of an IT resource over a specified period of time; and mapping, by a computer, a first number S of the members of the set of source platforms to a second number T of the members of the initial set of target platforms while observing at least one time-variant model mapping constraint wherein observing the at least one time-variant model mapping constraint comprises:

superimposing a plurality of sets of values associated with one or more time-variant demand models of an IT resource, wherein at least one of the plurality of sets of values is expressed as discrete values over time and at least one additional set of values of the plurality of sets of values is expressed as a continuous function, and comparing the superimposed plurality of sets of values with one or more sets of values describing availability of a corresponding IT resource over a corresponding period of time.

10. The computer system of claim 9, wherein the at least one time-variant model mapping constraint comprises an hour-by-hour model pattern.

11. The computer system of claim 9, wherein at least one of the time-variant model mapping constraints comprises a normalized time-variant model mapping constraint.

12. The computer system of claim 9, wherein the initial set of target platforms includes at least one of, an instance of a source platform from among the set of source platforms, a prospective target platform, or a database machine.

13. The computer system of claim 9, wherein the computer system further comprises program code to calculate an incompatibility matrix report.

14. The computer system of claim 9, wherein the mapping includes an optimization criterion.

15. The computer system of claim 14, wherein the optimization criterion comprises at least one of, a minimization function, or a maximization function.

16. The computer system of claim 9, wherein the computer system further comprises program code to:

generate a report of the mapping of the members of the set of source platforms to the members of the initial set of target platforms, the report including information describing one or more of the initial set of target platforms to which a member of the set of source platforms cannot be mapped due to the at least one time-variant model mapping constraint and one or more of a ratio of the first number S of the members of the set of source platforms mapped to a second number T of the members of the initial set of target platforms, a violation of a mapping constraint, and exclusion of one or more members of the set of source platforms from the mapping, wherein the at least one time-variant model mapping constraint is associated with usage of an IT resource during one or more specified days of a week.

17. A computer program product embodied in a non-transitory computer readable medium, the computer readable medium having stored thereon a sequence of instructions which, when executed by a processor causes the processor to execute a process to implement time-variant use models in constraint-based IT resource consolidation, the process comprising:

defining a set of source platforms, a member of the set of source platforms having a respective source platform profile having one or more time-variant demand models, at least some of the one or more time-variant demand models associated with a set of values describing demand for an IT resource over a specified period of time;

characterizing at least two members of the set of source platforms by measuring or defining the time-variant demand models of respective members of the set of source platforms;

defining an initial set of target platforms, a member of the initial set of target platforms selected from the set of source platforms and having a respective target platform profile having one or more initial time-variant availability models to compare with one or more of the time-variant demand models, at least some of the one or more initial time-variant availability models associated with a set of values describing availability of an IT resource over a specified period of time; and mapping, by a computer, a first number S of the members of the set of source platforms to a second number T of the members of the initial set of target platforms while observing at least one time-variant model mapping constraint, wherein observing the at least one time-variant model mapping constraint comprises:

superimposing a plurality of sets of values associated with one or more time-variant demand models of an IT resource, wherein at least one of the plurality of sets of values is expressed as discrete values over time and at least one additional set of values of the plurality of sets of values is expressed as a continuous function, and comparing the superimposed plurality of sets of values with one or more sets of values describing availability of a corresponding IT resource over a corresponding period of time.

18. The computer program product of claim 17, wherein the at least one time-variant model mapping constraint comprises an hour-by-hour model pattern.

19. The computer program product of claim 17, wherein at least one of the time-variant model mapping constraints comprises a normalized time-variant model mapping constraint.

20. The computer program product of claim 17, wherein the initial set of target platforms includes at least one of, an instance of a source platform from among the set of source platforms, a prospective target platform, or a database machine.

21. The computer program product of claim 17, wherein the computer readable medium further has instructions stored thereon which, when executed by a processor, causes the processor to calculate an incompatibility matrix report.

22. The computer program product of claim 17, wherein the mapping includes an optimization criterion.

23. The computer program product of claim 17, wherein the computer readable medium further has instructions stored thereon which, when executed by a processor, causes the processor to:

generate a report of the mapping of the members of the set of source platforms to the members of the initial set of target platforms, the report including information describing one or more of the initial set of target platforms to which a member of the set of source platforms cannot be mapped due to the at least one time-variant model mapping constraint and one or more of a ratio of the first number S of the members of the set of source platforms mapped to a second number T of the members of the initial set of target platforms, a violation of a mapping constraint, and exclusion of one or more members of the set of source platforms from the mapping, wherein the at least one time-variant model mapping constraint is associated with usage of an IT resource during one or more specified days of a week.

* * * * *